(12) United States Patent
Railsback et al.

(10) Patent No.: US 9,303,797 B2
(45) Date of Patent: Apr. 5, 2016

(54) OVERMOLDED STANDOFF AND METHOD FOR ABRASION ROUTING PROTECTION OF A HOSE

(75) Inventors: Layne Railsback, Brighton, CO (US); Donald R. Gilbreath, Castle Rock, CO (US); Michael H. Ellis, Denver, CO (US)

(73) Assignee: Gates Corporation, Denver, CO (US)

( * ) Notice: Subject to any disclaimer, the term of this patent is extended or adjusted under 35 U.S.C. 154(b) by 1494 days.

(21) Appl. No.: 11/784,494

(22) Filed: Apr. 6, 2007

(65) Prior Publication Data

US 2011/0297266 A1    Dec. 8, 2011

(51) Int. Cl.
*F16L 57/00* (2006.01)
*F16L 11/12* (2006.01)
*F16L 57/06* (2006.01)

(52) U.S. Cl.
CPC .............. *F16L 11/122* (2013.01); *F16L 57/06* (2013.01)

(58) Field of Classification Search
USPC ......................................... 138/110, 109, 124
See application file for complete search history.

(56) References Cited

U.S. PATENT DOCUMENTS

| | | | | |
|---|---|---|---|---|
| 2,236,731 A * | 4/1941 | Oberly | ........................... | 285/115 |
| 2,465,656 A | 3/1949 | Morin | ............................... | 18/59 |
| 3,263,520 A * | 8/1966 | Tschanz | ...................... | 74/502.4 |
| 3,272,235 A | 9/1966 | Haytock, III et al. | ......... | 138/107 |
| 3,565,116 A * | 2/1971 | Gabin | ........................... | 285/45 |
| 3,831,635 A * | 8/1974 | Burton | .......................... | 138/114 |
| 3,920,786 A | 11/1975 | Brunelle et al. | .............. | 264/251 |
| 4,009,733 A * | 3/1977 | Schnabel | ................ | F16L 11/12 |
| | | | | 138/103 |
| 4,114,929 A * | 9/1978 | Knapp | ............................. | 285/45 |
| 4,345,624 A * | 8/1982 | Rider | ............................. | 138/110 |
| 4,602,808 A * | 7/1986 | Herron et al. | .................... | 285/45 |
| 4,809,743 A * | 3/1989 | Sukimoto | ............... | B21C 37/29 |
| | | | | 123/456 |
| 5,526,846 A * | 6/1996 | Maloberti | ...................... | 138/109 |
| 5,895,695 A * | 4/1999 | Rowley | ......................... | 428/36.9 |
| 5,908,090 A * | 6/1999 | Fouts | ............................ | 188/71.1 |

(Continued)

FOREIGN PATENT DOCUMENTS

| | | | | |
|---|---|---|---|---|
| DE | 102 59 725 B3 | 4/2004 | .............. | F16L 55/00 |
| EP | 0 617 217 B1 | 2/1996 | ................ | F16L 3/14 |

(Continued)

OTHER PUBLICATIONS

Notification of Transmittal of the International Search Report and the Written Opinion of the International Searching Authority, or the Declaration, Date of Mailing Jul. 28, 2008.

*Primary Examiner* — James Hook
(74) *Attorney, Agent, or Firm* — Paul N. Dunlap, Esq.; Jeffrey A. Thurnau, Esq.

(57) ABSTRACT

An hose standoff comprises a sleeve molded onto a hose and a standoff flange extending circumferentially from the sleeve. The flange contacts a surface to which the hose is adjacent, spacing the hose away from the surface and any proximate edges. The sleeve may extend from the flange, along the hose, in at least one direction to protect the hose from abrasion or cutting by an edge extending perpendicular from the surface toward the hose. A metal collar may be crimped onto the hose with the sleeve overmolding the collar. Also, a fabric covering may be disposed over the hose with the collar crimped over the fabric covering and the sleeve overmolding the collar and at least a portion of the fabric covering. Preferably the sleeve overmold contacts and bonds or otherwise mechanically locks with the fabric covering and/or the underlying hose.

22 Claims, 2 Drawing Sheets

(56) References Cited

U.S. PATENT DOCUMENTS

| | | | | |
|---|---|---|---|---|
| 5,979,508 A | * | 11/1999 | Cherrington | F16L 57/00 138/108 |
| 6,123,111 A | * | 9/2000 | Nathan et al. | 138/109 |
| 6,220,303 B1 | * | 4/2001 | Secher et al. | 138/110 |
| 6,229,092 B1 | * | 5/2001 | Pirovano | B65G 19/14 138/123 |
| 6,293,504 B1 | | 9/2001 | Hartmann | 248/74.1 |
| 6,830,075 B1 | | 12/2004 | McKinney et al. | 138/106 |
| 8,651,146 B2 | * | 2/2014 | Johnson | H01B 7/426 138/106 |
| 2004/0050440 A1 | * | 3/2004 | Vohrer | 138/109 |
| 2006/0054231 A1 | * | 3/2006 | Wolfram et al. | 138/109 |

FOREIGN PATENT DOCUMENTS

| | | | |
|---|---|---|---|
| EP | 1 462 561 A1 | 9/2004 | D06F 39/08 |
| GB | 2 131 911 A | 6/1984 | F16L 11/12 |

* cited by examiner

OVERMOLDED STANDOFF AND METHOD FOR ABRASION ROUTING PROTECTION OF A HOSE

CROSS-REFERENCE TO RELATED APPLICATIONS

The present invention is related to U.S. patent application Ser. No. 11/487,913 filed Jul. 17, 2006, entitled "Hose and Tubing Assemblies and Mounting Systems and Methods," which is hereby incorporated herein by reference.

BACKGROUND OF THE INVENTION

1. Field of the Invention

This invention relates generally to flexible hoses and routing of such hoses. More particularly, the present invention relates to overmolded standoffs employed for abrasion routing protection of a hose or tube assembly and methods for providing such standoffs and routing protection.

2. Description of the Prior Art

Typically one of several different methods or designs for securing hose and/or tube assemblies to equipment will be employed. Typically, such designs are required to provide an ability to position and maintain the hose assembly relative to other components and protect the hose component of the assembly from mechanical damage. Currently a hydraulic hose assembly, or the like is protected from damage caused by close routing of the hose to other system components by using specially compounded rubber covers such as carboxylated nitrile, coatings such as high molecular weight polyethylene, additional plastic corrugated sleeves and/or mechanisms such as crimped-on metal clamp collars used to fasten the hose out of harms way. A fabric covering, such as a Cordura® covering, or the like, might be used to provide a minimal level of protection. However, such a covering is primarily intended to prevent a spray of escaping oil from a high pressure hose assembly from atomizing and potentially presenting an explosion or fire hazard. Other current solutions for providing hose abrasion protection may employ rub-rings or similar supports, which may be molded onto the hose, such as disclosed in Haytock, et al., U.S. Pat. No. 3,272,235; Brunelle, et al., U.S. Pat. No. 3,920,786; and McKinney, et al., U.S. Pat. No. 6,830,075.

These prior approaches typically fail to provide the desired degree of protection, particularly in an environment that presents sharp flange edges, such as seen in the accompanying Figures or a corner, such as a corner of a frame member or the like. Sharp edges quickly wear through resistance based protection such as the aforementioned covers or coatings, while rub rings or the like are intended to rest on more or less planer surfaces.

SUMMARY

The present invention is directed to systems and methods which provide abrasion routing protection of a hose or tube assembly through the use of an overmolded, or otherwise secured, standoff, which relocates wear points typically associated with hose or tube routing. Various embodiments of the present invention incorporate a standoff molded to a hose or tube, or otherwise secured to the hose or tube, to protect a hose body or tube from damage that can occur through contact with other components of a vehicle or machine on which the hose or tube assembly is deployed. The shape of the standoff may vary with the application. However, exemplar embodiments have a circular shape, which alleviates any need to orient the standoff, or the hose to which it molded, with respect to machine structures which could potentially abrade a hose. However, it is contemplated that different shapes or coverage could be used to address specific applications.

At least one embodiment of a hose standoff of the present invention includes a sleeve molded onto a hose. At least a portion of the sleeve may be bonded, fused, mechanically locked or joined, with an outside cover of the hose. This bonding, fusing, mechanical locking, or joining, generally referred to herein as "bonding," may be provided through flow of melted low viscosity thermoplastic material into intimate contact with the hose during processing and through contraction of the sleeve overmold onto the hose or tube surface. In accordance with the present invention overmold materials can be chosen for wear resistance and may contain modifying materials such as glass and molybdenum disulfide. A standoff flange preferably extends from the sleeve. The flange is adapted to contact a surface which the hose is disposed adjacent to, spacing the hose away from the surface and any nearby edges. Such edges may be associated with the surface. For example, an edge may be a lip extending generally perpendicular from the surface, toward the hose or an edge may be a corner defined by a frame member or the like that defines the surface.

In order to ensure that the standoff flange contacts the surface, regardless of radial orientation of the hose, the flange may extend circumferentially from the sleeve. Also, the sleeve may extend from the flange, along the hose in one, or both, directions. This may facilitate the sleeve protecting the hose from abrasion by an edge extending perpendicular from the surface toward the hose.

Thus, in accordance with the present invention a method for preventing abrasion of a hose might include disposing the hose such that the standoff flange contacts the surface, spacing the hose from the surface and any edges proximate to the surface, thereby reducing the chance of abrasion of the hose by the edges and the surface. In particular, the hose may be protected from abrasion by an edge extending perpendicular from the surface toward the hose by a portion of the sleeve that extends from the flange along the hose.

Embodiments of the present invention may employ a metal collar, which may be a crimped on the outside diameter of the hose and overmolded in accordance with the present invention. The collar may serve as a locating device and aid during the molding process. In particular, the metal collar may serve to keep the hose from collapsing during the molding process. Preferably, the sleeve extends beyond at least one end of the collar into contact with a cover of the hose. The portion of the sleeve that extends into contact with the cover of the hose may be at least partially bonded or mechanically joined as described above with the cover during overmolding.

In accordance with the present invention, a fabric covering may be disposed over the hose and the aforementioned collar may be crimped over the fabric covering. Preferably, a portion of the sleeve overmolds not only the collar, extending beyond the end of the collar, but also contacts at least a portion of the fabric covering, bonding with the fabric covering and/or the exterior of the underlying hose.

Advantageously, the present invention can be used to remove vital hose components transporting pressurized fluids from contact with sharp edges. A further advantage afforded by the present invention is that even if contact between a hose assembly and other machine components cannot be prevented, the wear point can be dictated by placement of a standoff in accordance with the present invention such that the wear point has more desirable characteristics. For example, the standoff may be placed so as to contact a greater surface area for reduced loading as compared to a sharp surface such as a flange lip or frame corner. Another advantage of the present invention is that the protection may be selectively applied by a designer for use only where protection is needed. By virtue of being molded onto the hose or tube, embodiments of the present standoff maintain their protective position relative to the hose or tube. Therefore, when machine operation moves the hose or tube away from a wear surface, the standoff maintains its position on the hose or tube. Thus, when subsequent machine operation moves the hose or tube back into the proximity of the wear surface, the standoff is still in position to prevent abrasion or other damage to the hose or tube.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
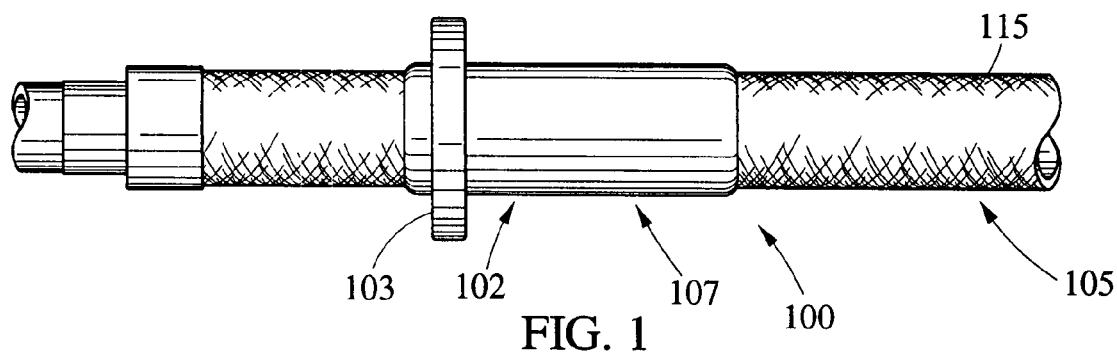
FIG. 1 is a generally planar side view of an embodiment of the present invention.

Turning to the Figures, hose standoff embodiment 100 is illustrated as having sleeve 102 molded onto hose 105 and standoff flange 103 extending from sleeve 102. However, in accordance with the present invention, sleeve 102 may be secured to the hose in other manners such as through use of a clamping mechanism, or the like. Also, hose 105 may be replaced with plastic or metal tubing but, the present description will discuss the use of the present invention with respect to hose assemblies.

Preferably at least a portion of sleeve 102 bonds or otherwise mechanically joins with a cover of hose 105. This bonding may occur as a result of flow of melted low viscosity thermoplastic material into intimate contact with the hose during processing and resulting contraction of sleeve overmold 102 upon setting. Preferably, standoff flange 103 extends circumferentially from sleeve 102 and portion 107 of sleeve 102 extends from flange 103, along hose 105, in at least one direction. In accordance with various embodiments of the present invention sleeve 102 and flange 103 work together to protect hose 105 from abrasion.

Figure 3:
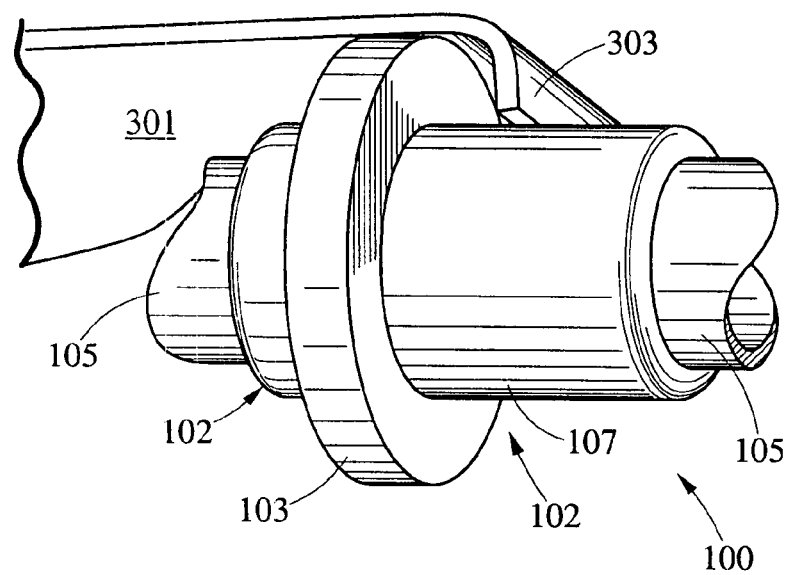
FIG. 3 is a partially fragmented environmental perspective view of routing of a hose adjacent to a flange edge employing an embodiment of the present invention.
Figure 4:
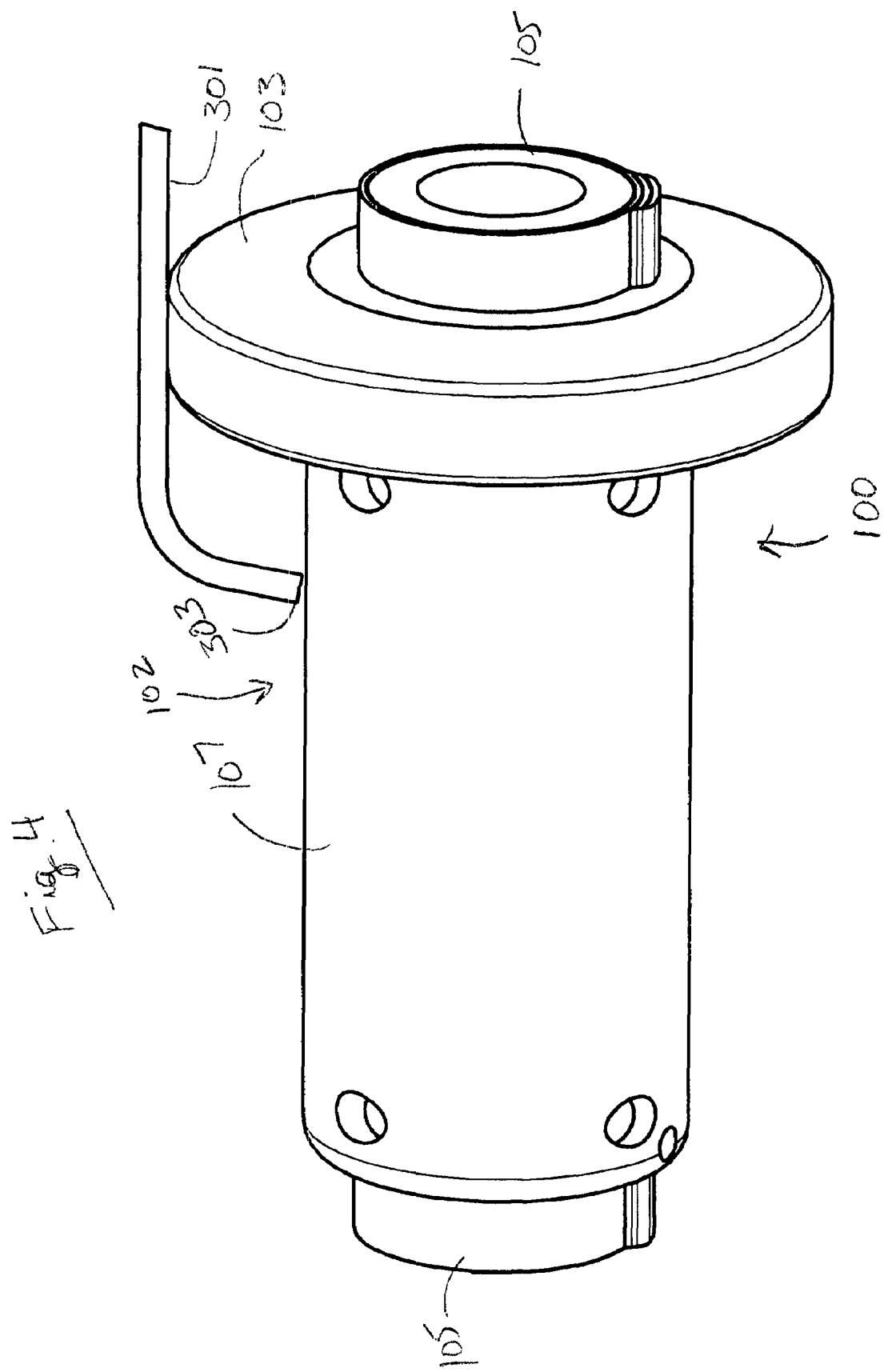
FIG. 4 is a partially fragmented environmental side view of routing of a hose adjacent to a flange edge employing an embodiment of the present invention.

In environmental FIGS. 3 and 4, flange 103 is shown contacting surface 301, spacing hose 105 away from surface 301 and edge lip 303 extending perpendicularly therefrom. Hose 105 may be disposed such that standoff flange 103 contacts surface 301, spacing hose 105 from surface 301 and any edges proximate to surface 301 thereby reducing abrasion of hose 105 by any nearby edges, such as lip 303, and/or surface 301 itself. Edges may be associated with a surface, such as lip 303 extending perpendicularly from surface 301, may be a corner defined by a member that defines such a surface, or other edges not associated with the surface that standoff flange 103 contacts. Portion 107 of sleeve 102 extending from flange 103 protects hose 105 from abrasion by edge 303 in environmental FIGS. 3 and 4.

Thus, sleeve 102 secures standoff flange 103 to hose 105 as well as protects hose 105 from abrasion by a edge that might extend from, or be defined by, a surface on which standoff flange 103 bears. Further, by being defined circumferentially around sleeve 102, it is ensured that standoff flange 103 spaces hose 105 apart from the surface flange 105 contacts regardless of radial orientation of hose 105. Flange 103 operates to relocate a wear point for hose 105. Normally hose 105 would wear at the point it crosses edge 303, or without flange 103 sleeve portion 107 would wear on edge 303. However, the standoff function provided by flange 103 moves the wear point to the flange and reduces the chance of wear on portion 107 of sleeve 102, while portion 107 protects hose 105 from damage by edge 303.

Figure 2:
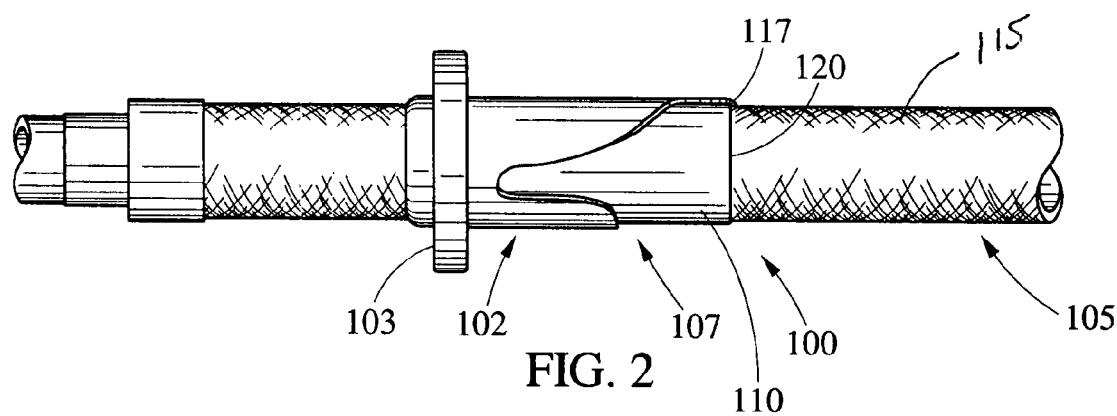
FIG. 2 is a partially fragmented side view of the embodiment of FIG. 1.

As best seen in fragmentary FIG. 2, collar 110 may be disposed about hose 105 in certain embodiments and may be crimped into place on hose 105. When used, collar 110 may be made of metal and preferably at least partially overmolded by sleeve 102. Thereby, sleeve 102 may extend beyond at least one end of collar 110 to contact and bond or otherwise mechanically join with the cover of hose 105. Advantageously, collar 110 may also aid in preventing collapse of hose 105 when sleeve 102 and flange are molded onto hose 105.

As also shown in FIGS. 1 and 2, fabric covering 115 may be disposed over the hose. If a collar is employed, it may be crimped over fabric covering 115, as collar 110 is shown crimped over cover 115 in FIG. 2. In certain embodiments, a portion of sleeve 102 overmolds collar 110 to extend beyond the end of the collar, such as distal end 117 of sleeve portion 107 is shown extending over end 120 of collar 110 in FIG. 2. Also, this overmolded portion preferably contacts at least a portion of fabric covering 115 and bonds or otherwise mechanically locks with fabric covering 115 and/or the exterior of underlying hose 105. However, in other embodiments of the present invention sleeve 102 might not extend over end 120 of collar 110. For example, sleeve 102 may bond to the collar itself. Such embodiments are particularly well suited for use in embodiments which replace hose 105 with tubing.

For embodiments employing a collar, collar 110 may serve as a locating device during the molding process. It is desirable that the hose/collar assembly be position in an overmold injection cavity correctly and that the resulting overmolded sleeve and flange be axially positioned on the hose assembly correctly. In accordance with various embodiments of the present invention, the overmolded sleeve extends (117) past collar end 120 on each end. In such embodiments it may be desirable to center or maintain the collar relative to the overmolded sleeve. This preferably prevents the thickness of the plastic overmolding edge 117 of collar 102 from being too thin, thereby avoiding cracking of sleeve 102 during thermal cycling of the assembly and/or due to the differences in thermal coefficient of expansion of a metal collar and the thermoplastic overmolded sleeve.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hose assembly comprising a hose with an integral hose standoff comprising:
   a sleeve portion molded onto the hose at a distance from the ends of the hose and from any end fitting present on the hose;
   a collar disposed about said hose, said sleeve portion overmolds said collar and extends beyond at least one end of said collar, contacting said hose;
   a standoff flange portion extending circumferentially from said sleeve portion, said flange portion adapted to contact a surface to which said hose is disposed adjacent, spacing said hose away from the surface and edges proximate said surface,
   whereby said sleeve portion protects said hose from abrasion or cutting by the surface or the edge.

2. The hose assembly of claim 1, wherein said sleeve portion extends from said flange portion, along said hose, in both directions.

3. The hose assembly of claim 2 wherein said sleeve portion extends from said flange farther along said hose in one direction than the other.

4. The hose assembly of claim 1, wherein said sleeve portion extends from said flange portion, along said hose, in at least one direction.

5. The hose assembly of claim 1, wherein said sleeve portion extends beyond both ends of said collar, contacting said hose.

6. The hose assembly of claim 5, wherein said portion of said sleeve portion that contacts said hose at least partially bonds with an exterior of said hose.

7. The hose assembly of claim 5, wherein said collar prevents collapse of said hose when said sleeve portion and flange portion are molded onto said hose.

8. The hose assembly of claim 1, wherein said collar is made of metal.

9. The hose assembly of claim 8 wherein said collar is crimped onto said hose.

10. The hose assembly of claim 9, further comprising a fabric covering disposed over said hose, said collar crimped over said fabric covering and said sleeve portion overmolding said collar and at least a portion of said fabric covering.

11. The hose assembly of claim 10, wherein said sleeve portion extends beyond at least one end of said collar to contact said fabric covering.

12. The hose assembly of claim 11, wherein said portion of said sleeve portion that extends to said covering at least partially bonds with said covering.

13. The hose assembly of claim 1 wherein said flange is a circular flange of greater diameter than said sleeve.

14. A method comprising:
   crimping a collar onto a hose at a distance from the ends of the hose and from any end fitting present on the hose;
   overmolding a sleeve onto said hose at a distance from the ends of the hose and from any end fitting present on the hose, said sleeve defining a standoff flange extending circumferentially from said sleeve, wherein said overmolding comprises overmolding said collar and extending said sleeve beyond at least one end of said collar to contact said hose;
   said standoff flange adapted to contact a surface, spacing said hose from said surface and edges proximate to said surface thereby protecting said hose from abrasion or cutting by said edges or said surface.

15. The method of claim 14, wherein said sleeve portion extends from said flange along the hose in both directions, and farther along said hose in one direction than the other.

16. The method of claim 14, further comprising:
   extending said sleeve from said flange, along said hose, in at least one direction.

17. The method of claim 14, further comprising:
   extending said sleeve from said flange, along said hose, in both directions.

18. The method of claim 17, further comprising extending said sleeve beyond both ends of said collar to contact said hose.

19. The method of claim 14, further comprising:
   extending said sleeve beyond at least one end of said collar to a cover of said hose; and
   at least partially bonding said sleeve with said cover.

20. The method of claim 19 wherein said cover is fabric.

21. The method of claim 14, further comprising:
   preventing collapse of said hose with said collar when said sleeve and flange are overmolded onto said hose.

22. The method of claim 14 further comprising:
   locating said hose in an injection mold using said collar.

* * * * *